March 3, 1970 C. A. SECKERSON 3,497,923
CABLE CLIP
Filed July 30, 1968

*INVENTOR*
*Clifford Alexander Seckerson.*
by *Philip E. Parker*
*Attorney.*

United States Patent Office 3,497,923
Patented Mar. 3, 1970

3,497,923
CABLE CLIP
Clifford A. Seckerson, Iver Heath, England, assignor to United-Carr Incorporated, Boston, Mass., a corporation of Delaware
Filed July 30, 1968, Ser. No. 748,672
Claims priority, application Great Britain, Aug. 11, 1967, 36,936/67
Int. Cl. H02g 3/26; F16b 7/04, 7/22
U.S. Cl. 24—81                            3 Claims

ABSTRACT OF THE DISCLOSURE

A resilient clip for retaining a cable in position through an aperture in a panel, the clip being so designed to provide a wide tolerance on the cable diameters with which it can be effectively used. The clip is generally U-shaped and comprises two outwardly splayed limbs joined by an apertured web through which the cable passes. Each limb has a foot at its free end which is directed inwardly and rearwardly towards the web, the free ends of the feet being clamped against the cable. When the clip is located on the cable and is inserted into the aperture in the panel the limbs are compressed together by the rim of the aperture and the feet are simultaneously pinched between the limbs and the cable making a firm connection between the clip and the cable.

BACKGROUND TO THE INVENTION

It is known to provide a resilient clip in the manner of a grommet to locate and hold a cable in position through an aperture in a panel. Hitherto, known clips of this type have been provided with internal prongs or lugs which bite into the cable and resist movement of the cable through the clip. This type of clip has the disadvantage that very little tolerance is allowed on the cable diameter. If the cable is too large, the clip and cable cannot be forced into the panel aperture and if the cable is too small the clip will not grip the cable effectively. The purpose of the present invention is to provide a clip of this general type which allows for a wide tolerance on the cable size and will effectively grip and retain cables of a wide range of diameters.

SUMMARY OF THE INVENTION

According to the present invention there is provided a resilient clip for retaining an elongate member in position through an aperture in a panel, the clip comprising two limbs joined by a web to form an approximate U-shape, the web being apertured to receive the elongate member therethrough and the limbs being splayed outwardly from the web, wherein a foot is provided at the end of each limb, the feet being directed inwardly towards the opposite limb so as to grip the elongate member and rearwardly towards the web so as to be resiliently compressible towards the limbs when the limbs are pinched together and to thereby resist movement of the elongate member through the clip in a direction from the web towards the feet.

DESCRIPTION OF THE PREFERRED EMBODIMENT

Figure 1:
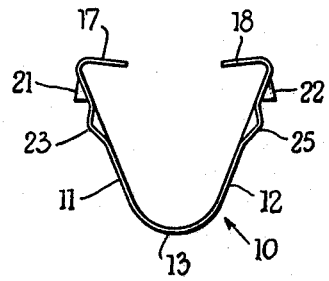
FIGURE 1 is an elevation of a resilient clip according to the invention.
Figure 2:
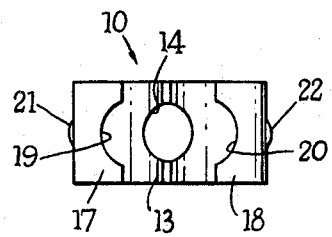
FIGURE 2 is a plan view of the clip of FIGURE 1.

In FIGURES 1 and 2 a clip is indicated generally at 10. The clip 10 is formed to the shape shown from a single strip of metal and during manufacture is rendered resilient and, preferably, rustproof.

In its finished state the clip 10 is approximately U-shaped comprising two generally flat limbs 11 and 12 joined by a bowed web 13. The web 13 is formed with an aperture 14 to receive a cable.

From the web 13 the limbs are splayed outwardly and the ends of the two limbs are bent inwardly and downwardly towards the web 13 to form feet 17 and 18, the transverse end edge of each foot being formed with a notch in the form of an arcuate recess 19 and 20 respectively adapted to partially accommodate the cable.

Adjacent the feet 15 and 16 each limb is formed with a centrally located outwardly directed projection 21 and 22 respectively, each projection 21 and 22 being pressed out of the respective limb and having its lower edge sheared through.

Immediately beneath the projections 21 and 22 respectively each limb is formed with a pair of projections in the form of outwardly bent lugs 23 and 25 which are sheared and bent from its longitudinal edges in a well known manner.

Figure 3:
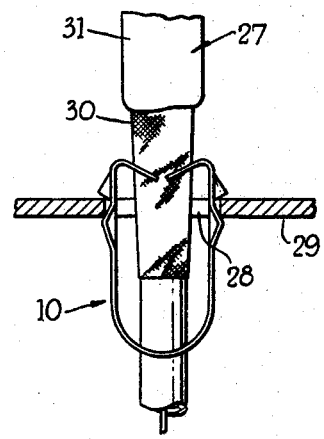
FIGURE 3 is an elevation partly in section of a cable held in place through an aperture in a support panel by the clip of FIGURES 1 and 2.

In FIGURE 3 the clip 10 is shown holding a cable 27 in position through a square aperture 28 in a support panel 29. The cable comprises an electrically conductive inner component 30 and an insulating sheath 31, which has been stripped at the point where the cable passes through the panel 29.

In order to locate the cable in position through the panel, the cable is first passed through the aperture 14 in the web of the clip 10. The cable is then threaded through the aperture 28 and the clip 10 is forced, web first into the aperture 28. As the limbs enter the aperture 28 they are forced together and the feet 17 and 18 which bite onto the inner component 30 of the cable, are forced outwardly towards the limbs.

The clip is forced down through the panel 29 until the lugs 23 and 25 are located beneath the panel and the projections 21 and 22 engage the upper surface of the panel. As shown in FIGURE 3 the panel is then trapped between the projections and the lugs, and the feet 17 and 18 prevent the cable 27 from moving lengthwise through the clip 10.

The clip 10 ensures electrical contact between the component 30 of the cable 10 and the support panel 29 and will accommodate cables of widely varying diameter.

If the diameter of the cable is increased the feet 17, 18 of the clip fold inwardly to a greater extent to compensate for the increased cable diameter and the grip exerted on the cable is increased. This advantageous feature of the clip 10 reduces the risk of a pooor electrical connection between the cable and the panel and also the risk of movement of the cable if the cable is of smaller diameter than normal.

What I claim is:

1. A resilient clip for retaining an elongate member in position through an aperture in a panel, the clip comprising two limbs joined by a web to form an approximate U-shape, the web being apertured to receive the elongate member therethrough and the limbs being splayed outwardly from the web, wherein a foot is provided at the end of each limb, the feet being directed inwardly towards the opposite limb so as to grip the elongate member and rearwardly towards the web so as to be resiliently compressible towards the limbs when the limbs are pinched together and to thereby resist movement of the elongate member through the clip in a direction from the web towards the feet.

2. A clip as claimed in claim 1, wherein each limb is provided with outwardly extending means for engaging the panel edge and resisting movement of the clip through the panel aperture.

3. A clip as claimed in claim 2, wherein the end edge of each foot is shaped to complement and snugly receive the elongate member.

References Cited

UNITED STATES PATENTS

| 1,740,765 | 12/1929 | Burnett | 248—56 |
| 1,839,522 | 1/1932 | Alden. | |
| 2,125,843 | 8/1938 | Hall | 339—128 |
| 2,211,739 | 8/1940 | Churchill | 339—128 |
| 2,244,977 | 6/1941 | Hansman et al. | 248—27 |
| 2,340,703 | 2/1944 | Schwabacher | 339—103 |

DONALD A. GRIFFIN, Primary Examiner

U.S. Cl. X.R.

248—56; 339—128